United States Patent [19]

Götz

[11] 4,356,054
[45] Oct. 26, 1982

[54] DEVICE FOR FEEDING METAL-FOIL SECTIONS TO A LAMINATING STATION

[75] Inventor: Wolfgang Götz, Krefeld-Fischeln, Fed. Rep. of Germany

[73] Assignee: G. Siempelkamp GmbH & Co., Krefeld, Fed. Rep. of Germany

[21] Appl. No.: 175,944

[22] Filed: Aug. 7, 1980

[30] Foreign Application Priority Data

Aug. 11, 1979 [DE] Fed. Rep. of Germany ....... 2932698

[51] Int. Cl.³ ............................................. B32B 31/00
[52] U.S. Cl. ..................................... 156/517; 83/277; 83/379; 83/382; 83/734; 100/93 P; 100/97; 156/556; 156/583.1; 156/288
[58] Field of Search ............... 156/256, 264, 288, 517, 156/556, 583.1; 100/93 P, 94, 96, 97, 215, 222, 258 A; 83/277, 282, 388, 389, 375, 379, 382, 414, 734

[56] References Cited

U.S. PATENT DOCUMENTS

| | | | |
|---|---|---|---|
| 3,701,299 | 10/1972 | Stumpf | 83/72 |
| 3,874,976 | 4/1975 | MacFarland, Jr. | 156/515 |
| 3,991,926 | 11/1976 | Marks | 83/277 X |
| 4,079,645 | 3/1978 | Nunes et al. | 83/277 X |

Primary Examiner—John E. Kittle
Attorney, Agent, or Firm—Karl F. Ross

[57] ABSTRACT

A foil-section feeder in a laminating system includes a slicing assembly which clamps a web at a pair of spaced locations and subsequently cuts the web along a transverse line between the two clamps. A transport device in the form of gripper tongs is inserted into a gap in the slicing assembly to grip a leading end of the web and to draw the web from a roll past the slicing assembly to a predetermined position at a stacking or laminating station.

8 Claims, 7 Drawing Figures

4,356,054

DEVICE FOR FEEDING METAL-FOIL SECTIONS TO A LAMINATING STATION

FIELD OF THE INVENTION

My present invention relates to a laminating system. In particular, my present invention relates to a device or apparatus for feeding metal-foil sections to a stacking station or pressure-plate assembly for laminating with respective carrier mats or base boards, preferably in the form of resin-impregnated plates.

BACKGROUND OF THE INVENTION

In the production of laminations consisting of a metal layer and a base layer or carrier mat, such laminations being utilizable in the manufacture of printed circuits, a plurality of base layers and metal sections are paired and interleaved with pressure plates at a laminating station. Generally the metal sections are cut by means of shears from a web issuing from a coil or roll, the cut sections then being transported by means of suction grippers or conveyor belts to a table or platform for pairing with respective base layers. These base layers are usually impregnated with synthetic resins such as phenolics; however, fiber glass is also used.

Such devices or apparatuses for feeding metal-foil sections to a stacking or laminating station can only be used if the foil sections have a minimum thickness and are manipulatable like metal sheets or thin metal plates.

OBJECT OF THE INVENTION

The object of my present invention is to provide an improved feeding apparatus of the above-mentioned type which is suitable for handling thin metal foils.

SUMMARY OF THE INVENTION

An apparatus for feeding sections of metal foil to a stacking or aligning station for subsequent lamination with respective base layers or boards, according to my present invention, comprises, a frame juxtaposed to the stacking station, a source of metal foil on the frame, a first holder on the frame downstream of the foil source relative to a path of foil transport for clamping at a first position a metal foil web drawn from the source, and a second holder on the frame downstream of the first holder for clamping the web at a second position, whereby a portion of the web is fixed between the two clamping positions. A slicer or cutting edge, preferably in the form of a blade, is disposed on the frame between the first holder and the second holder for transversely cutting the web along a line extending perpendicularly to the transport path, while an extractor or transport device is shiftably mounted on the frame for gripping a leading end of the web substantially in the region of the slicer and for pulling the web along the transport path from the source and past the holders and the slicer to move a leading section of the web into a predetermined position at the stacking or laminating station. A drive is operatively connected to the holders, to the slicer and to the extractor for actuating the same according to a pre-establishing operating cycle for cutting from the web successive sections having a predetermined common length.

According to another feature of my present invention, the feeder apparatus further comprises a substantially horizontal support surface on the frame extending to the first holder and having a breadth substantially equal to the width of the web. The first holder includes a first vertically reciprocatable clamping bar disposed above the support surface and extending perpendicularly to the transport path, while the second holder includes a second and a third vertically reciprocatable clamping bar spaced from the first clamping bar along the transport path. The slicer includes a vertically reciprocatable counter bar which coacts with the blade in cutting the web, this counter bar preferably being rigid with the third clamping bar.

According to another feature of my present invention, the extractor comprises a gripper including a horizontally shiftable pair of tongs or jaws for projecting into a gap formed between the second and the third clamping bar upon the severing of the web by the blade and the counter bar and for gripping a leading end of the web projecting beyond and edge of the support surface at least upon a retracting stroke of the blade counter bar.

Pursuant to further features of my present invention, the first clamping bar and at least one of the second and third clamping bars have respective elastic strips for contacting the web, and the second and the third clamping bar respectively constitute an upper and a lower clamping bar. The blade and the counter bar respectively constitute an upper slicing member and a lower slicing member, the lower slicing member being provided with an upper surface which forms an extension of the support surface in an uppermost position of the lower slicing member to support a leading end of web at least during a cutting stroke of the upper slicing member.

Pursuant to yet further features of my present invention, the second and the third clamping bar are adjustably mounted on the frame for selectively varying the distance between the first clamping bar and the third clamping bar, while the drive includes programmer-controlled pressurized fluidic actuators which may be hydraulic but are preferably pneumatic.

A foil-section feeder according to my present invention is capable of handling very thin metal webs. The clamping of a web by the first and second holder ensures an adequate tensioning of the web in preparation for a cutting stroke of the slicer. A leading end of the web, i.e. upon a cutting thereof, need only project a centimeter or two beyond the edge of the support table to enable gripping of the tongs and subsequent transport to the stacking station. The blade may be adjustably mounted on the frame for selective positioning in the direction of foil transport, whereby foils or webs of different thicknesses may be sliced to have leading ends extending beyond the support surface by different lengths. The blade counter bar may include removable extensions to facilitate coaction of the counter bar and the blade upon adjustment thereof.

BRIEF DESCRIPTION OF THE DRAWING

These and other features of my present invention will now be described in detail, reference being made to the accompanying drawing in which:

FIG. 6 is a diagrammatic side view of pressure plates at a laminating station for simultaneously forming a plurality of laminations; and FIG. 7 is a diagrammatic top view of a laminating station utilizing a foil-feeder according to my present invention.

SPECIFIC DESCRIPTION

Figure 1:
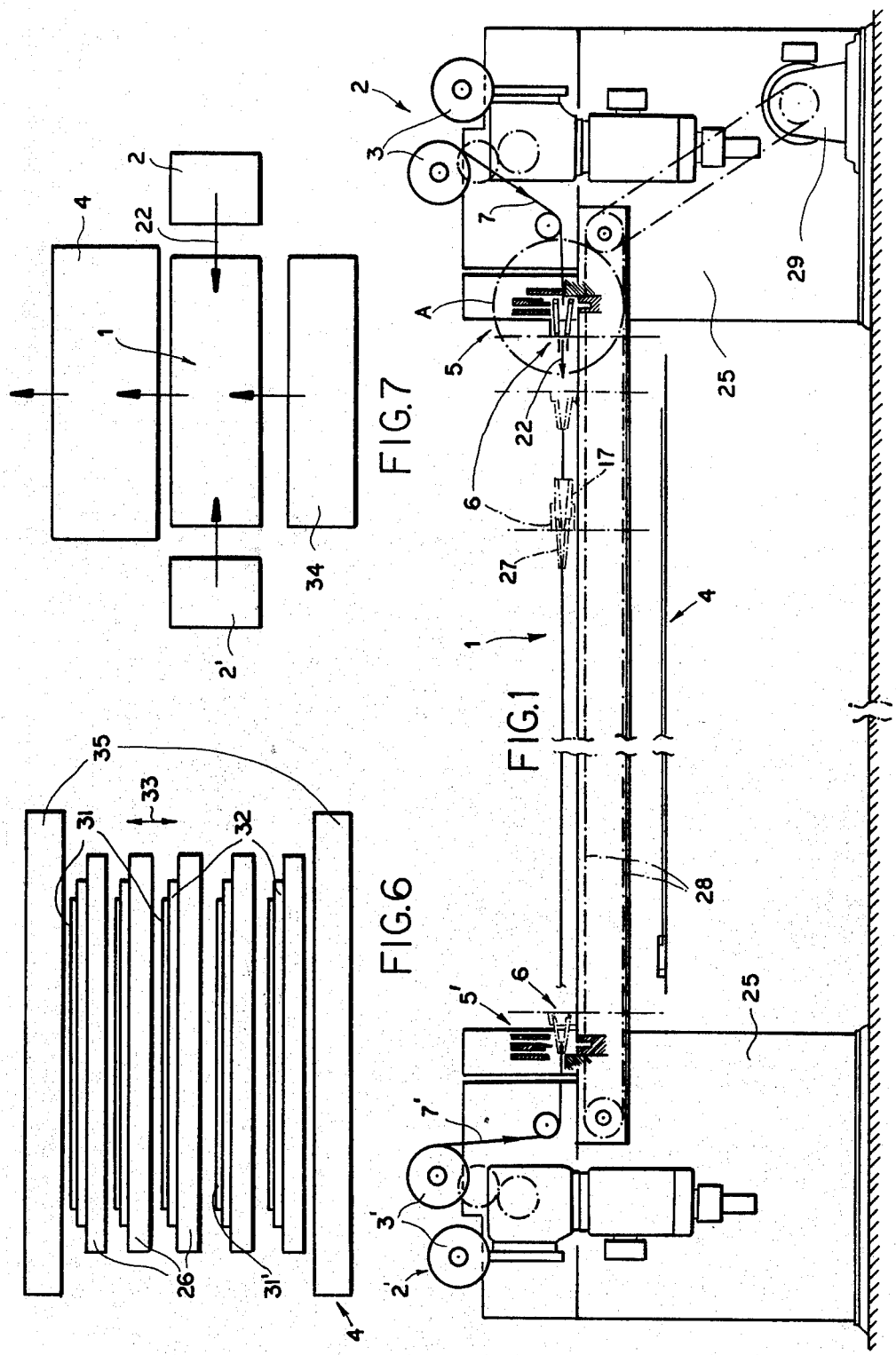
FIG. 1 is a partially diagrammatic and partially cross-sectional side view of an apparatus, according to my present invention, at a laminating station for feeding thereto sections of metal foil, showing a slicing assembly and a transport device.

As illustrated in FIG. 1, an apparatus for feeding to a stacking or laminating station 1 a series of metal-foil sections 31 (FIG. 6) having a substantially common length comprises, according to my present invention, one or more metal-foil rolls 3 rotatably mounted at a storage station 2 on a frame 25, a slicing assembly 5 disposed downstream of storage station 2 relative to a transport path of a foil 7 drawn from rolls 3, and a transport device 6 shiftably mounted preferably on frame 25 for gripping a leading end 16 (see FIG. 2) of foil or web 7 and pulling the same from roll or rolls 3 past slicing assembly 5 onto a platen or pressure plate 26 (see FIG. 6) at laminating station 1. As indicated in FIG. 1 in dot-dash lines, transport device 6 includes a pair of oppositely facing and oppositely acting tongs or jaws 17 and 27 mounted on an endless belt or chain 28 which is driven by a reversible motor 29 under the control of a programmer 30 (see FIG. 2).

As schematically illustrated in FIGS. 1 and 6, a plurality of pressure plates 26 are movably disposed at laminating station 1 (arrow 33) undergoing recurrent or cyclical vertical shifts in preparation for receiving respective base boards 32 from a lamination feeder 34 (FIG. 7) and respective foil sections 31 from the apparatus according to my present invention. Base boards 32 may be plates impregnated with synthetic resins such as phenolics and may form a lower or base layer of a printed circuit board. Plates 26 are vertically aligned in a hydraulic press 35.

As shown in FIGS. 1 and 7, it is advantageous if a pair of feeding apparatuses according to my present invention are disposed on opposite sides of laminating station 1. Then transport gripper 6 may interleave metal-foil sections 31 and 31' cut by slicing devices 5 and 5' from respective webs 7 and 7' drawn from rolls 3 and 3'.

As shown in detail in FIGS. 2–5, slicing device 5 includes a platform 8 having an upper guide surface 36 for at least partially supporting web 7 upon a relaxation or removal of a pulling force thereon. Surface 36 has a breadth at least equal to the width of web 7.

Slicing assembly 5 further includes a vertically reciprocable foil-clamping foil-holding bar 9 extending substantially perpendicularly to a foil-transport path or direction 22 (see FIG. 3) and being provided with an elastic clamping strip 19 for engaging web 7. A pair of coacting foil-clamping bars 10 and 11 are shiftably mounted on frame 25 at a distance 14 from bar 9 for vertically reciprocating to alternatively clamp and release web 7 respectively before and after a downward cutting stroke of a blade bar 12 disposed in the space between bars 9 and 10. Lower clamping bar 11 is rigid with a counter bar member 13 which coacts with a cutting edge 12' on blade bar 12 to transversely sever web 7, i.e. to cut the same along a line extending perpendicular to foil-transport path 22. Slicing member 13 has an upper surface 20 which forms in an uppermost position (see FIGS. 4 and 5) of member 13 an extension of platform support surface 36.

Upper clamping bar 10 is equipped with an elastic gripper strip 19' for engaging web 7 upon an extraction stroke of transport gripper 6 and for pinning the web to an upper surface of lower clamping member 11.

Figure 2:
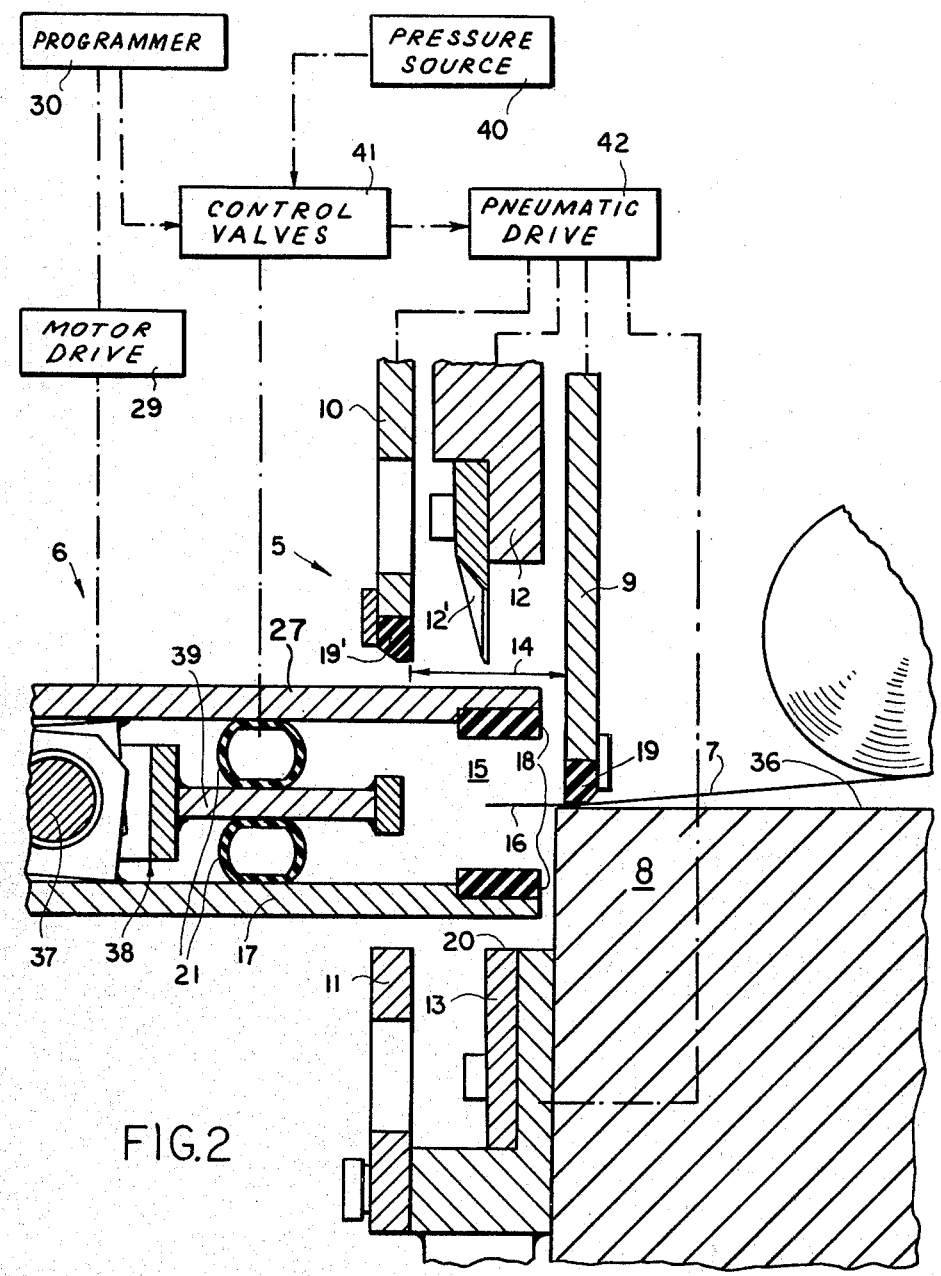
FIG. 2 is a cross-sectional detail view of area A in FIG. 1, showing the slicing assembly and transport device.
Figure 3:
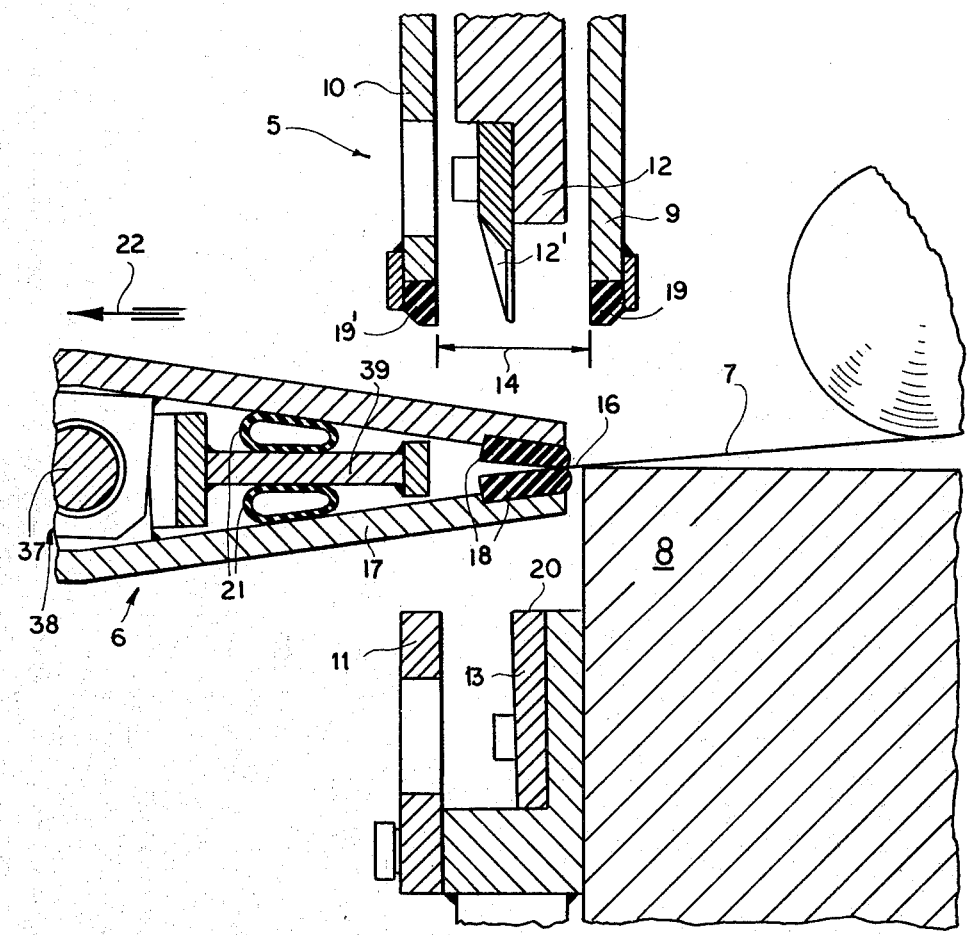
FIG. 3 is a view similar to FIG. 2, showing a different stage in the cooperative action of the slicing assembly and the transport device of FIGS. 1 and 2.
Figure 5:
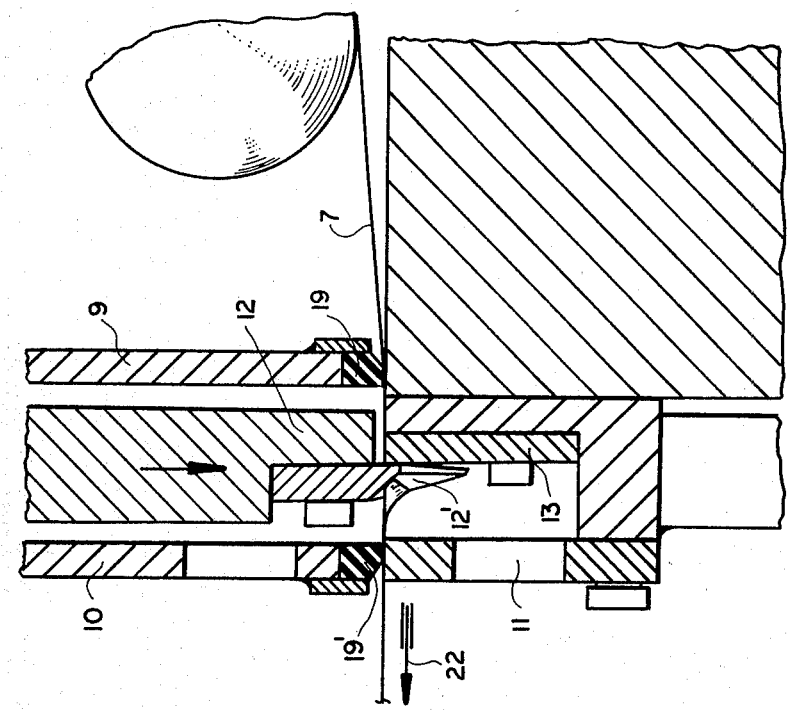
FIG. 5 is a view similar to FIGS. 2–4, showing yet another stage in the operation of the slicing assembly of FIGS. 1–4.

As best seen in FIGS. 2 and 3, transport-gripper device 6 includes integrally formed tongs or jaws 17 and 27 pivotally mounted at 37 on a frame 38. This frame has a pair of flanges or wings 39 extending horizontally on opposite sides of pivot 37, inflatable tubes 21 being inserted between flanges 38 and the respective upper and lower members of tongs 17 and 27. As schematically shown in FIG. 2, tubes 21 are connected to a preferably pneumatic pressure source 40 via control valves 41 operated by programmer 30.

Tongs 17 and 27 are provided at their free ends with inwardly facing elastic strips 18 having a high coefficient of friction for forming an adequate friction lock with leading foil end 16.

Upon the completion of an operating cycle of a feed apparatus according to my present invention, tongs 17 (or 27) are inserted by motor drive 29 under the control of programmer 30 into a gap or slit-like opening 15 formed between upper clamping bar 10 and lower clamping bar 11 and between blade holder or bar 12 and blade counter bar 13. As shown in FIG. 2, tongs 17 are in a jaws-open disposition due to the pressurization of the tubes 21 contacting tongs 17 and the simultaneous depressurization of the tubes contacting tongs 27.

Figure 4:
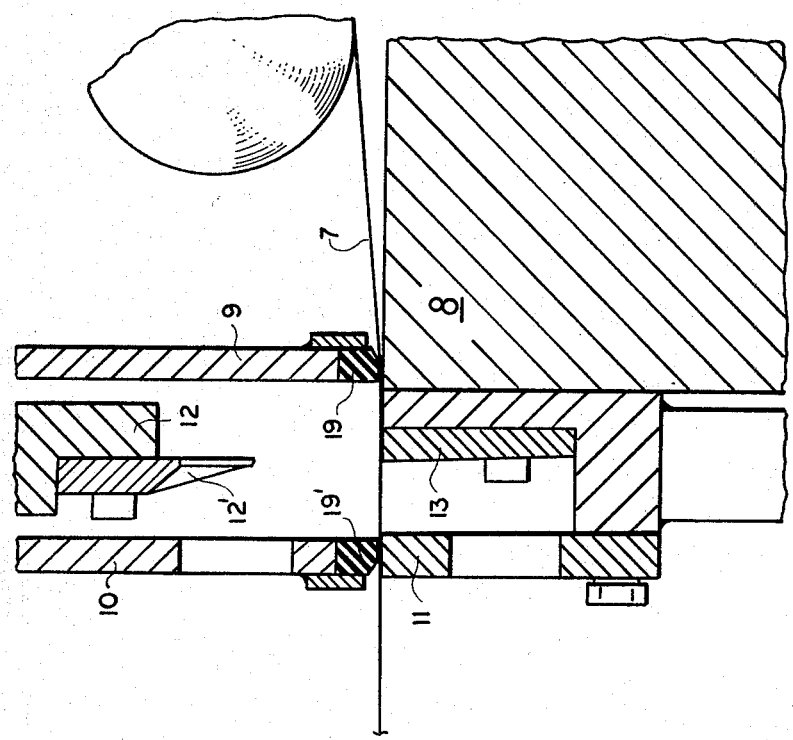
FIG. 4 is a view similar to FIGS. 2 and 3, showing another stage in the operation of the slicing assembly of FIGS. 1–3.

Upon the termination of a horizontal shift of transport device 6, programmer 30 actuates control valves 41 to connect to pressure source 40 the tubes 21 contacting tongs 27 and to connect to the atmosphere the tubes 21 contacting tongs 17. As illustrated in FIG. 3, tongs 17 assume a jaws-closed disposition in which elastic strips 18 grip the leading end 16 of foil 7. The programmer then energizes a fluidic, preferably pneumatic, drive 42 (FIG. 2) via valves 41 to raise upstream clamping bar 9, thereby releasing foil 7. Motor 29 is activated to withdraw tongs 17 from slot or gap 15 and to move foil-transport device 6 in the direction of arrow 22 (see FIGS. 1, 3 and 7) through a laminating assembly 4 including pressure plates 26 and 35 (FIG. 6). Upon the completion of this withdrawal stroke of transport device 6, clamping bar 9 is lowered by drive 42 under the control of programmer 30 and valves 41 to lock foil 7 against platform or support 8 at an upstream position. Upper clamping bar 10 and lower clamping bar 11, together with blade counter bar 13, are subsequently shifted by programmer 30 via valves 41 and pneumatic cylinders 42 into a closed position in which web or foil 7 is held or locked at a downstream location, as illustrated in FIG. 4. The clamping of the foil on one side by bar 9 and platform 8 and on another side by bars 10 and 11 ensure a tensioning of the foil upon a downward stroke of cutting edge 12', indicated in FIG. 5.

Upon the termination of this downward stroke, upper clamping bar 10 and blade bar 12 are raised and lower clamping bar 11, together with blade counter bar 13, lowered, whereby foil-extraction slot 15 is formed. Motor 29 is energized to shift transport device 6 further in the direction of arrow 22, i.e. toward slicing assembly 5′ (see FIG. 1), whereby a trailing edge of the newly formed foil section is removed from gap 15 of slicing assembly 5. At assembly 5′ tongs 27 may be inserted into a foil-extraction slot to initiate an operating cycle for this assembly analogous to the heretofore-described process for slicing assembly 5.

Upon the placing of a newly cut foil section 31 on a respective base board 32 by transport device 6, laminating assembly 4 is incrementally shifted either upwardly or downwardly to align an unpaired base board 32 with slicing devices 5 and 5′. As indicated in FIG. 7, feeder 34 may be juxtaposed to laminating station 1 for placing base boards 32 on respective pressure plates 26 prior to the associated foil placement by transport device 6. It is advantageous to have feeder 34 vertically staggered with respect to foil feeders 3, 5 and 3′, 5′. Plates 26, and possibly plates 35, are heated for softening the resins of base boards 32 to form a bond between same and foil sections 31.

As indicated in FIG. 7, pressure-plate assembly 4 may be preferably juxtaposed to stacking station 1 opposite base-board feeder 34, stacking station 1 comprising a table or platform on which each base board 32 and its respective foil section 31 are paired prior to transport to pressure plate assembly 4.

Clamping bars 10 and 11 are adjustably mounted on frame 25 for varying distance 14 and for varying their relative positions in a closed or clamping state, whereby webs of different thicknesses may be handled.

I claim:

1. An apparatus for feeding sections of metal foil to a stacking station for subsequent lamination with respective base boards, said apparatus comprising:
   a frame juxtaposed to said stacking station;
   a source of metal foil on said frame;
   first holding means on said frame downstream of said source relative to a path of foil transport for clamping at a first position a metal web drawn from said source;
   second holding means on said frame downstream of said first holding means for clamping said web at a second position, thereby fixing a portion of said web between said positions;
   slicing means on said frame between said first holding means and said second holding means for transversely cutting said web along a line extending perpendicularly to said path;
   extracting means shiftably mounted on said frame for gripping a leading end of said web substantially in the region of said slicing means and pulling said web along said path from said source and past said first and said second holding means and said slicing means to move a leading section of said web into a predetermined position at said stacking station;
   a substantially horizontal upwardly facing support surface on said frame extending downstream of said source to said first holding means and having a breadth substantially equal to the width of said web, said first holding means including a first vertically reciprocatable clamping bar disposed above said surface and extending in a direction perpendicular to said path, said second holding means including a second and a third vertically reciprocatable clamping bar spaced apart from said first clamping bar along said path and straddling same, said slicing means including a vertically reciprocatable blade, said extracting means being positioned to reach between said second and third bars.

2. The apparatus defined in claim 1 wherein said slicing means includes a vertically reciprocatable counter bar coacting with said blade in cutting said web.

3. The apparatus defined in claim 2 wherein said counter bar is rigid with said third clamping bar.

4. The apparatus defined in claim 3 wherein said extracting means comprises gripper means including horizontally shiftable tongs for projecting into a gap formed between said second and said third clamping bar upon the severing of said web by said blade and said counter bar and for gripping a leading end of said web extending past an edge of said surface.

5. The apparatus defined in claim 4 wherein said first clamping bar and one of said second and third clamping bars have respective elastic strips for contacting said web.

6. The apparatus defined in claim 4 or 5 wherein said second and said third clamping bar respectively constitute an upper and a lower clamping bar, said blade and said counter bar respectively constituting an upper slicing member and a lower slicing member, said lower slicing member being provided with an upper surface forming an extension of said support surface in an uppermost position of said lower slicing member to support a leading end of said web at least during a cutting motion of said upper slicing member.

7. The apparatus defined in claim 4 or 5 wherein said second and said third clamping bar are adjustably mounted on said frame for selectively varying the distance between said first clamping bar and said second clamping bar and between said first clamping bar and said third clamping bar.

8. The apparatus defined in claim 4 or 5 wherein said drive means includes programmer-controlled pressurized fluidic actuators.

* * * * *